United States Patent
Cheng et al.

(10) Patent No.: US 6,690,352 B2
(45) Date of Patent: Feb. 10, 2004

(54) MULTI-MODE INPUT CONTROL DEVICE

(75) Inventors: Yu-Chih Cheng, Taipei (TW); Tzu-Chiang Shih, Taipei (TW)

(73) Assignee: Primax Electronics Ltd. (TW)

( * ) Notice: Subject to any disclaimer, the term of this patent is extended or adjusted under 35 U.S.C. 154(b) by 201 days.

(21) Appl. No.: 09/843,468

(22) Filed: Apr. 26, 2001

(65) Prior Publication Data

US 2002/0126095 A1 Sep. 12, 2002

(30) Foreign Application Priority Data

Mar. 8, 2001 (TW) .......................................... 90105466 A

(51) Int. Cl.$^7$ ................................................. G09G 5/00
(52) U.S. Cl. ........................ 345/156; 345/163; 345/167
(58) Field of Search ................................. 345/156, 157, 345/163, 164, 165, 166, 167, 173

(56) References Cited

U.S. PATENT DOCUMENTS

| | | | | | |
|---|---|---|---|---|---|
| 5,049,863 A | * | 9/1991 | Oka | ............................ | 345/163 |
| 5,063,289 A | * | 11/1991 | Jasinski et al. | ............... | 345/163 |
| 5,280,276 A | * | 1/1994 | Kwok | ............................ | 45/167 |
| 5,287,246 A | * | 2/1994 | Sen | ............................... | 361/683 |
| 5,298,919 A | * | 3/1994 | Chang | ........................... | 345/163 |
| 5,669,015 A | * | 9/1997 | Chidester et al. | ............ | 395/893 |
| 5,793,355 A | * | 8/1998 | Youens | ........................ | 345/157 |
| 5,886,686 A | * | 3/1999 | Chen | ........................... | 345/168 |
| 6,040,820 A | * | 3/2000 | Choi | ............................ | 345/156 |
| 6,147,673 A | * | 11/2000 | Zarek | ........................... | 345/156 |
| 6,184,869 B1 | * | 2/2001 | Harding et al. | ............. | 345/166 |
| 6,369,798 B1 | * | 4/2002 | Yatsu et al. | .................. | 345/167 |
| 6,476,795 B1 | * | 11/2002 | Derocher et al. | ............ | 345/163 |

* cited by examiner

*Primary Examiner*—Steven Saras
*Assistant Examiner*—Fritz Alphonse
(74) *Attorney, Agent, or Firm*—Peter F. Corless; Steven M. Jensen; Edwards & Angell, LLP

(57) ABSTRACT

A multi-mode input control device for use with a computer via a graphic user interface (GUI) is disclosed. The input control device may optionally perform functions of a mouse device and a trackball device. The mouse and trackball devices share the same key switch, control unit, interface circuit, and signal channel to the computer, which are included in the mouse device. In the mouse mode, the mouse device is individually moved to perform the input control operation in a conventional manner. For the trackball mode, a first signal connector of the trackball device and a second signal connector of the mouse device are connected to each other so that the trackball device can perform the input control operation via the mouse device.

24 Claims, 6 Drawing Sheets

MULTI-MODE INPUT CONTROL DEVICE

FIELD OF THE INVENTION

The present invention relates to an input control device, and more particularly to a multi-mode input control device for use with a computer via a graphic user interface (GUI).

BACKGROUND OF THE INVENTION

So far, a mouse device and a trackball device have been most common and popular input control devices for personal computers, especially for use with more and more complicated and diverse graphic user interfaces (GUIs). FIG. 1 schematically shows a circuit block diagrams of a conventional input control device. The input control device includes an operation sensor 11, a key switch 12, a control unit 13, an interface circuit 14, and a signal channel 15. The operation sensor 11 generates a cursor movement control signal in response to an operation of a user on the input control device. Then, the user presses the key switch 12 to generate an input signal corresponding to the cursor movement control signal or give a command. The cursor movement control signal and the input signal are transmitted to the control unit 13 to be processed, and further transmitted to the interface circuit 14 to be transformed into a designated format. Finally, the signals are transmitted to a computer (not shown) to complete cursor control or command input operations. The major difference between a mouse device and a trackball device lies in that while the user has to hold the mouse device with his palm to move in a plane, the user manipulates a ball structure of a fixed trackball device with his fingers. For different users and different graphic user interfaces, it is hard to say which one is more convenient and popular than the other. For example, for playing games or for a baby child, a large trackball device may be preferred. On the contrary, for editing documents or drawing pictures, a mouse device may be more convenient than a trackball device. If these two devices are provided at the same time for different requirements, they will occupy two ports of the computer and double space on the desk.

SUMMARY OF THE INVENTION

Therefore, an object of the present invention is to provide a multi-mode input control device which allows the functions of a mouse device and a trackball device to be performed as desired.

A first aspect of the present invention relates to a multi-mode input control device for use with a computer via a graphic user interface. The multi-mode input control device includes a trackball for performing a rotating motion in response to a first external force; a trackball sensor for generating a first cursor movement control signal according to the rotating motion; a first signal connector electrically connected to the trackball sensor for transmitting the first cursor movement control signal; a base housing accommodated therein the trackball sensor and mounted thereon the trackball and the first signal connector; and a mouse device connected to the computer via a signal channel, performing a shift motion in response to a second external force, generating a second cursor movement control signal according to the shift motion, and including a second signal connector to be coupled to the first signal connector. In a first mode that input control is performed by the mouse device, the first and second signal connectors are disconnected, and the second cursor movement control device is transmitted to the computer via the signal channel. In a second mode that input control is performed by the trackball, the first and second signal connectors are connected, and the first cursor movement control signal is transmitted to the computer via the signal channel.

Preferably, the mouse device includes a mouse sensor for generating the second cursor movement control signal according to the shift motion; a switching device electrically connected to the mouse sensor and the second signal connector for allowing either of the first and second cursor movement control signals to pass through the signal channel; a key switch for entering a command to the computer by exerting thereon a third external force so as to generate an input signal; a control unit electrically connected to the switching device and the key switch for processing the first and second cursor movement control signals and the input signal; an interface circuit electrically connected to the control unit and the signal channel for transforming the first and second cursor movement control signals and the input signal into a designated format suitable for transmission to the computer; and a mouse housing accommodated therein the mouse sensor, the switching device, the control unit and the interface circuit, and mounted thereon the second signal connector and the key switch.

Preferably, the first signal connector is directly mounted on the base housing, and the second signal connector is directly mounted on the mouse housing so that the mouse housing is attached to the base housing when the first and second signal connectors are connected.

Preferably, the base housing includes a recess on a surface thereof for receiving the mouse device, the first signal connector is arranged in the recess, and electric connection between the first and second signal connectors are achieved once the mouse device is placed into the recess.

According to a second aspect of the present invention, the multi-mode input control device includes a touch pad for generating a first cursor movement control signal according to a user's touch motion thereon; a first signal connector electrically connected to the touch pad for transmitting the first cursor movement control signal; a base housing mounted thereon the touch pad and the first signal connector; and a mouse device connected to the computer via a signal channel, performing a shift motion in response to a second external force, generating a second cursor movement control signal according to the shift motion, and including a second signal connector to be coupled to the first signal connector; wherein in a first mode that input control is performed by the mouse device, the first and second signal connectors are disconnected, and the second cursor movement control device is transmitted to the computer via the signal channel, and in a second mode that input control is performed by the touch pad, the first and second signal connectors are connected, and the first cursor movement control signal is transmitted to the computer via the signal channel.

According to a third aspect of the present invention, the multi-mode input control device includes a first housing having a recess on a surface thereof, and keeping unmoved during the input control operation; a first input device accommodated in the first housing for generating a first cursor movement control signal in response to a first external force; a first signal connector mounted on the first housing in the recess and electrically connected to the first input device for transmitting the first cursor movement control signal to the computer; a second housing optionally received in the recess, and moved during the input control operation; a second input device accommodated in the second housing for generating a second cursor movement control signal in response to a second external force; a second signal connector mounted on the second housing at a specific position corresponding to a position of the first signal connector when the second housing is received into the recess of the first housing, and electrically connected to the second input device for transmitting the second cursor movement control signal to the computer in a first mode that the input control operation is performed by the second input device, and transmitting the first cursor movement control signal to the computer in a second mode that the input control operation is performed by the first input device; and a switching device electrically connected to the first and second input devices for determining either of the first and second modes is performed.

In an embodiment, the second device is a mouse device, and the first device is a trackball device or a touch pad device.

Preferably, the multi-mode input control devicefurther includes a signal channel electrically connected to the second input device for communicating with the computer. In the first mode, the first and second connectors are disconnected so that the second input device is individually moved to generate the second cursor movement control signal, and the second cursor movement control signal is transmitted to the computer via the signal channel. In the second mode, the first and second connectors are electrically connected so that the first input device is manipulated to generate the first cursor movement control signal, and the first cursor movement control signal is transmitted to the computer via the first and second signal connectors and the signal channel.

The signal channel preferably includes a signal cable, an infrared-ray (IR) signal transmission module, or a radio-frequency (RF) signal transmission module.

Preferably, the second input device includes a sensor for generating the second cursor movement control signal according to the movement of the second housing; a key switch for entering a command to the computer by exerting thereon a third external force so as to generate an input signal; a control unit electrically connected to the switching device and the key switch for processing the first and second cursor movement control signals and the input signal; and an interface circuit electrically connected to the control unit and the signal channel for transforming the first and second cursor movement control signals and the input signal into a designated format suitable for transmission to the computer.

Preferably, the switching device is electrically connected to the sensor and the second signal connector for allowing either of the first and second cursor movement control signals to pass through the signal channel.

According to a fourth aspect of the present invention, the multi-mode input control device includes a first housing keeping unmoved during an input control operation; a first input device accommodated in the first housing for generating a first cursor movement control signal in response to a first external force; a first signal connector mounted on the first housing and electrically connected to the first input device for transmitting the first cursor movement control signal to the computer; a second housing optionally attached to the first housing, and moved during the input control operation; a second input device accommodated in the second housing for generating a second cursor movement control signal in response to a second external force; a signal channel electrically connected to the second input device for communicating with the computer; and a second signal connector mounted on the second housing at a specific position corresponding to a position of the first signal connector when the second housing is attached to the first housing, and electrically connected to the second input device for transmitting the second cursor movement control signal to the computer via the signal channel in a first mode that the input control operation is performed by the second input device, and transmitting the first cursor movement control signal to the computer via the signal channel in a second mode that the input control operation is performed by the first input device.

In the first mode, the first and second connectors are disconnected so that the second input device is individually moved to generate the second cursor movement control signal, and the second cursor movement control signal is transmitted to the computer via the signal channel. On the other hand, in the second mode, the first and second connectors are electrically connected so that the first input device is manipulated to generate the first cursor movement control signal, and the first cursor movement control signal is transmitted to the computer via the first and second signal connectors and the signal channel.

Preferably, the second input device includes a sensor for generating the second cursor movement control signal according to the movement of the second housing; a switching device is electrically connected to the sensor and the second signal connector for allowing either of the first and second cursor movement control signals to pass through the signal channel; a key switch for entering a command to the computer by exerting thereon a third external force so as to generate an input signal; a control unit electrically connected to the switching device and the key switch for processing the first and second cursor movement control signals and the input signal; and an interface circuit electrically connected to the control unit and the signal channel for transforming the first and second cursor movement control signals and the input signal into a designated format suitable for transmission to the computer.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
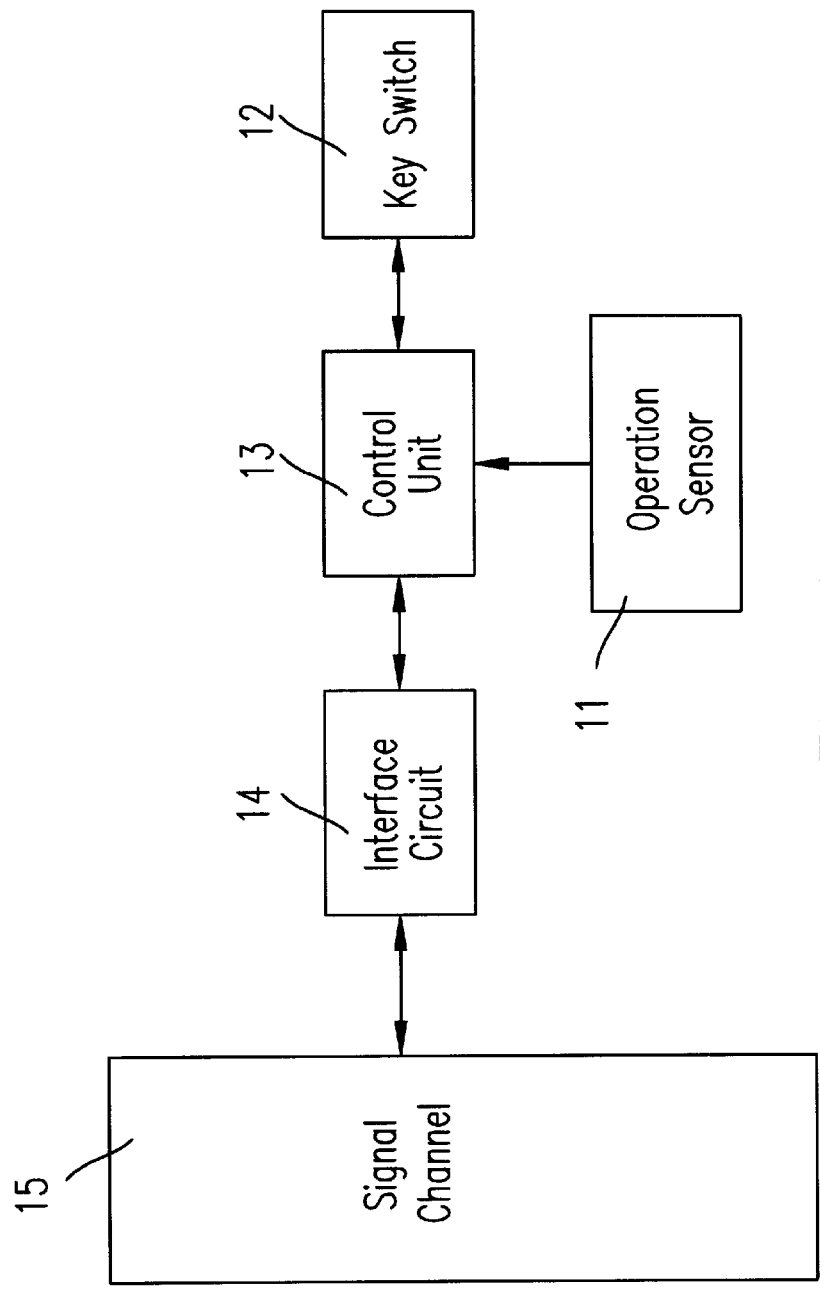
FIG. 1 is a schematic circuit block diagram showing a conventional input control device such as a mouse device or a trackball device.
Figure 2:
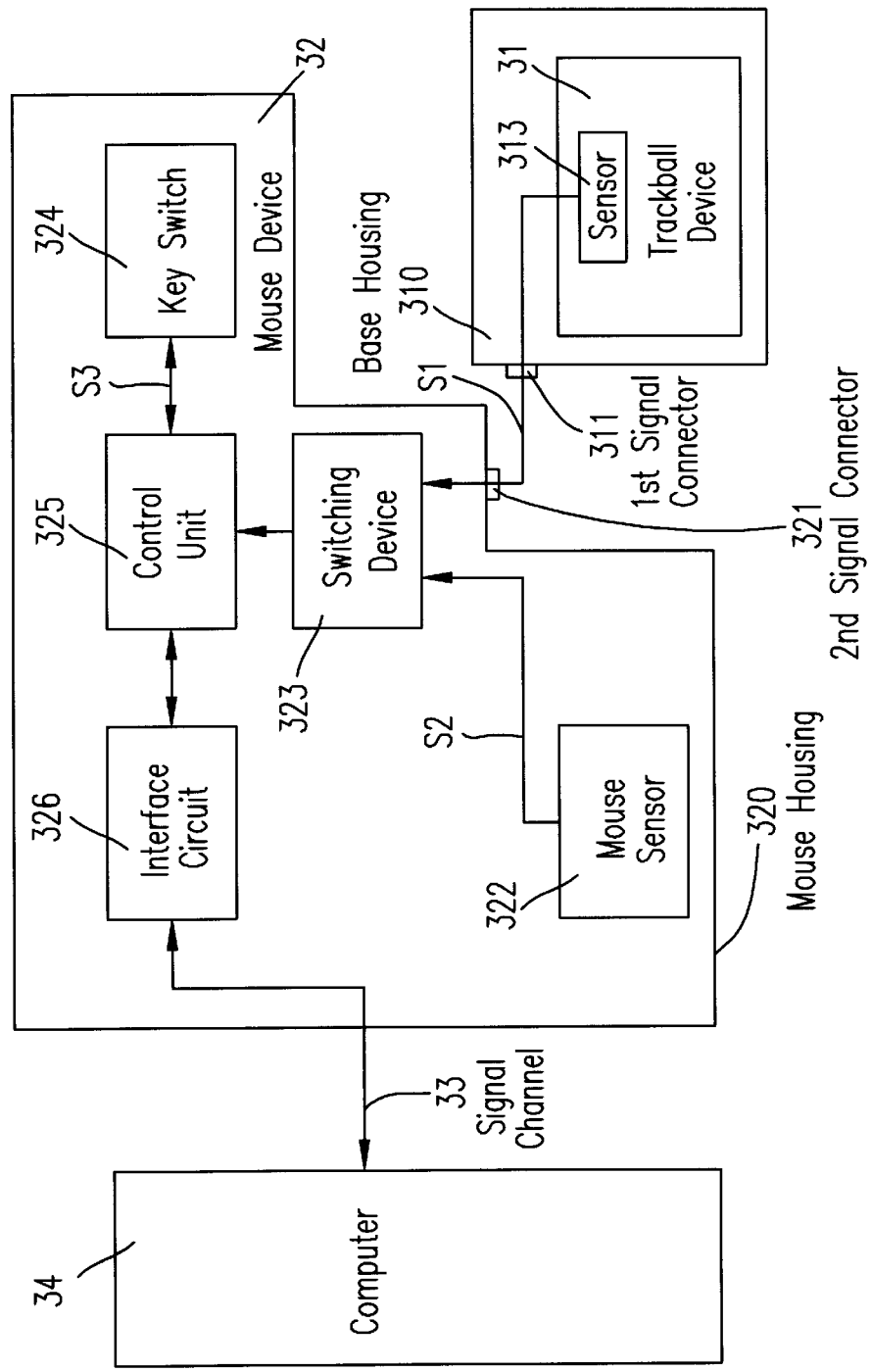
FIG. 2 is a schematic circuit block diagram showing an embodiment of a double-mode input control device according to the present invention, which performs functions of a mouse device and a trackball device.

Please refer to FIG. 2 which is a schematic circuit block diagram showing an embodiment of a double-mode input control device according to the present invention. The input control device consists of a trackball device 31 and a mouse device 32 having respective housings 310 and 320. The trackball device 31 includes a trackball 314 (FIG. 3A or 3B) partially protruding from the base housing 310, a trackball sensor 313 accommodated in the housing 310, and a first signal connector 311 mounted on and exposed from the housing 310. The mouse device 32 includes a mouse sensor 322, a switching device 323, a control unit 325 and an interface circuit 326 accommodated in the housing 320, and a second signal connector 321 and a key switch 324 mounted on and exposed from the housing 320. The mouse device 32 also includes a signal channel 33 such as a signal cable, an infrared-ray (IR) signal transmission module or a radio-frequency (RF) signal transmission module for communicating with a computer 34.

Figure 3A:
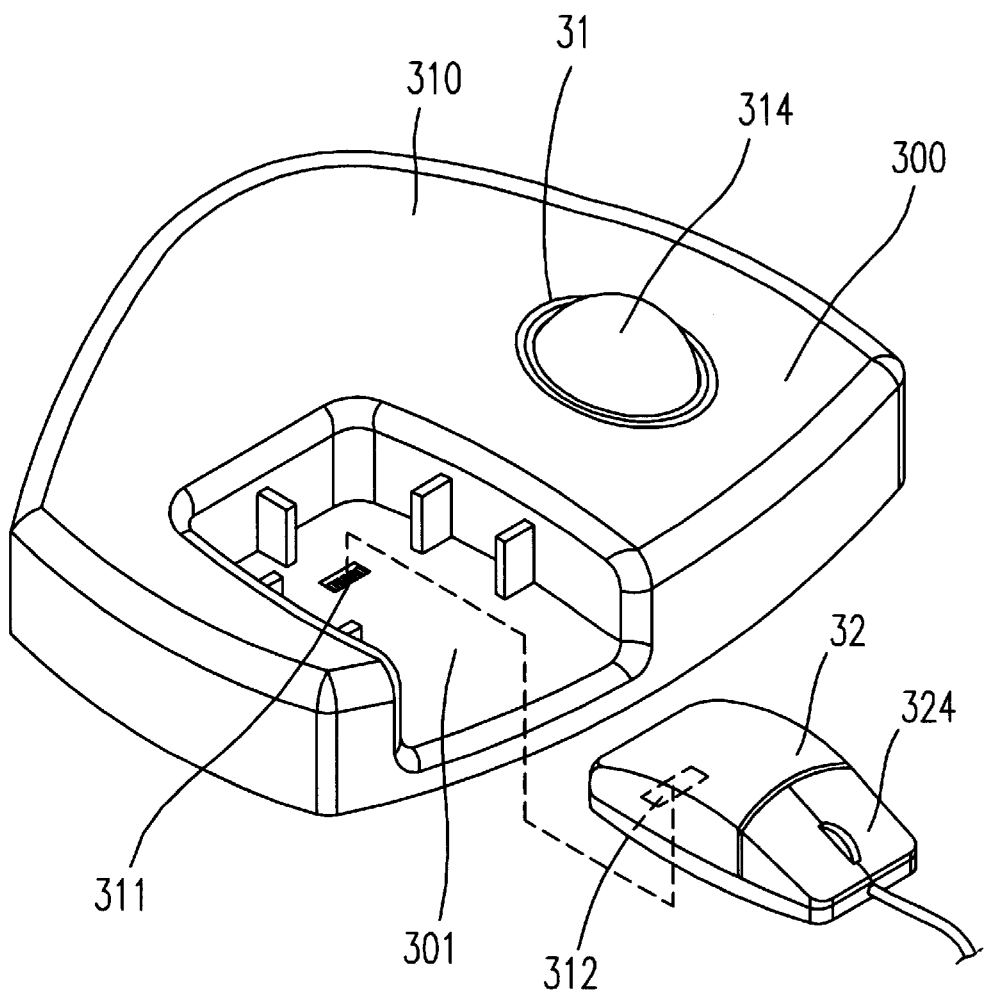
FIG. 3A is a schematic diagram showing an exemplified structure of the double-mode input control device of FIG. 2 wherein the mouse device is detached from the trackball device.
Figure 3B:
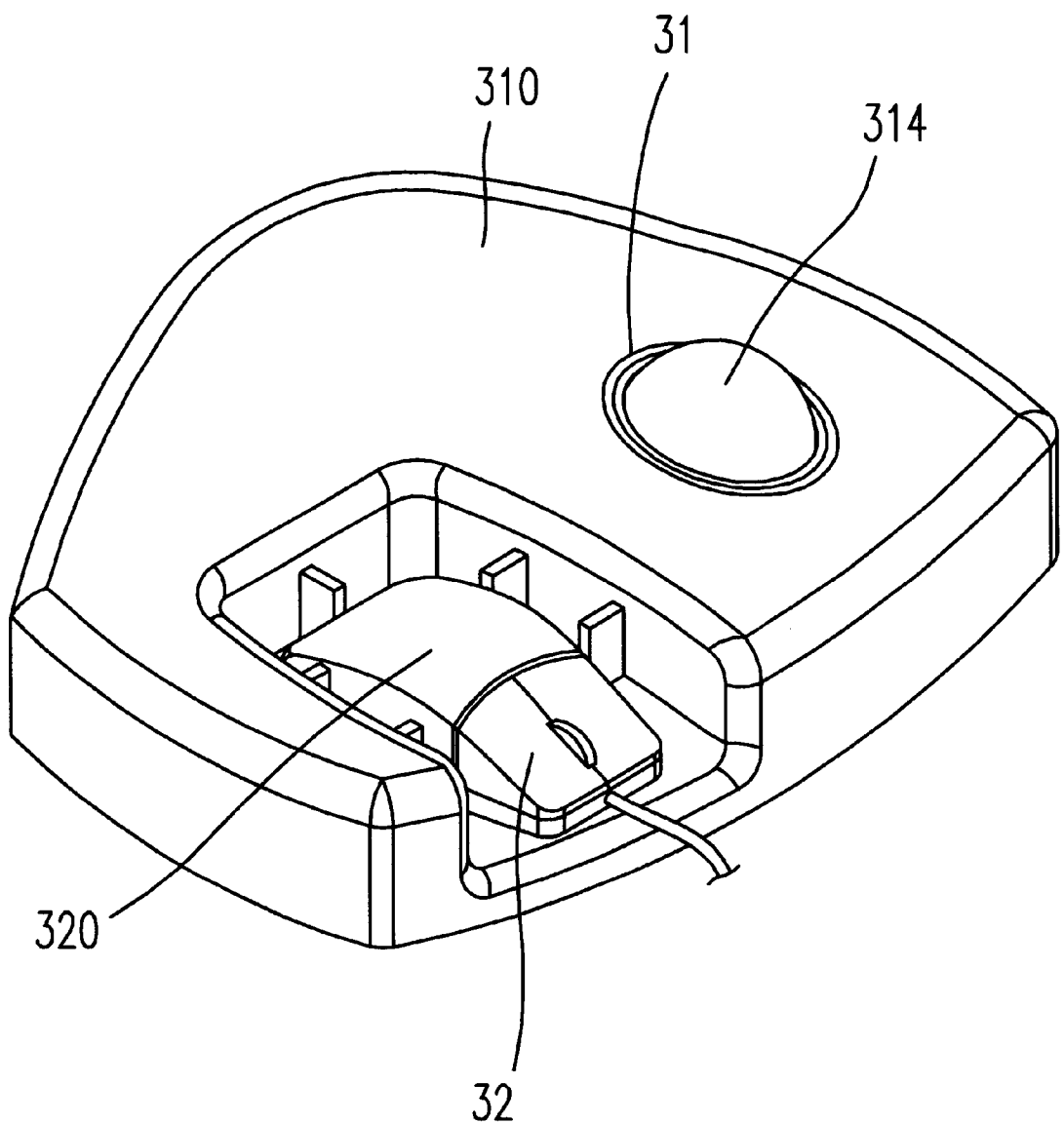
FIG. 3B is a schematic diagram showing an exemplified structure of the double-mode input control device of FIG. 2 wherein the mouse device is attached to the trackball device.

Referring to FIGS. 3A and 3B, the base housing 310 includes a recess 301 on a surface 300 thereof for receiving the mouse device 32. The first signal connector 311 is arranged in the recess 301. The second signal connector 321 is mounted on the mouse housing 320 at a specific position corresponding to the first signal connector 311 in the recess 301. Therefore, when the mouse device 32 is placed into the recess 301 of the base housing 310, as shown in FIG. 3B, the first and second signal connectors 311 and 312 are electrically connected with each other (FIG. 3A) so that signals of the trackball device 31 can be transmitted to the computer via the mouse device 32.

The double-mode input control device of this embodiment allows functions of a mouse device and a trackball device to be optionally performed. In the mouse mode, the user detaches the mouse device 32 from the base housing 310, and manipulates the mouse device to perform a shift motion in a conventional manner. The mouse sensor 322 detects the shift motion, and generates a cursor movement control signal S2. Meanwhile, the user may press the key switch 324 to give a command corresponding to the cursor movement result so as to generate an input signal S3. The signals S2 and S3 are transmitted to the control unit 325 to be processed, and transformed into a proper transmission format in the interface circuit 326. Then, the signals of the proper format are transmitted to the computer 34 via the signal channel 33.

Alternatively, in the trackball mode, the user places the mouse device 32 into the recess 301 of the base housing 310 to have the first and second signal connectors 311 and 321 connected with each other, and manipulates the trackball 314 to perform a rotating motion in a conventional manner. The trackball sensor 313 detects the rotating motion, and generates a cursor movement control signal S1. Meanwhile, the user may press the key switch 324 to give a command corresponding to the cursor movement result so as to generate an input signal S3. The switching device 323 permits only the cursor movement control signal S1 rather than S2 to pass therethrough once the first and second signal connectors 311 and 321 are connected. The signals S1 and S3 are transmitted to the control unit 325 to be processed, and transformed into a proper transmission format in the interface circuit 326. Then, the signals of the proper format are transmitted to the computer 34 via the signal channel 33. The first and second signal connectors 311 and 312 can be male/female signal connectors used in a cellular phone, socket/pin signal connectors, or any other suitable signal connectors. On the other hand, if desired for some reasons, the first and second signal connectors 311 and 321 may be mounted to the housings 310 and 320 via cables (not shown), respectively. The connection between the first and second signal connectors 311 and 321 can also be achieved via a cable.

Figure 4:
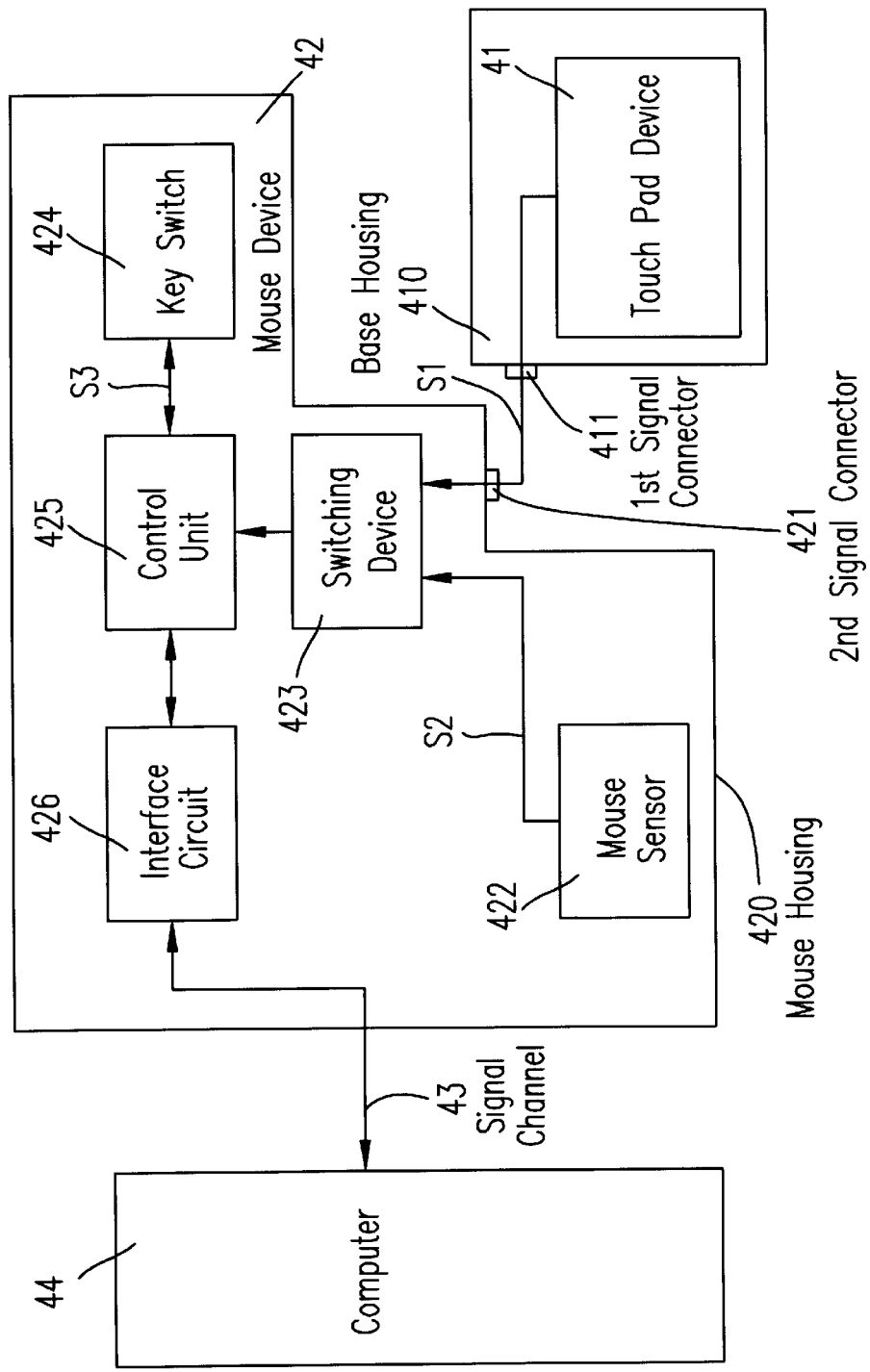
FIG. 4 is a schematic circuit block diagram showing another embodiment of a double-mode input control device according to the present invention, which performs functions of a mouse device and a touch pad device.
Figure 5:
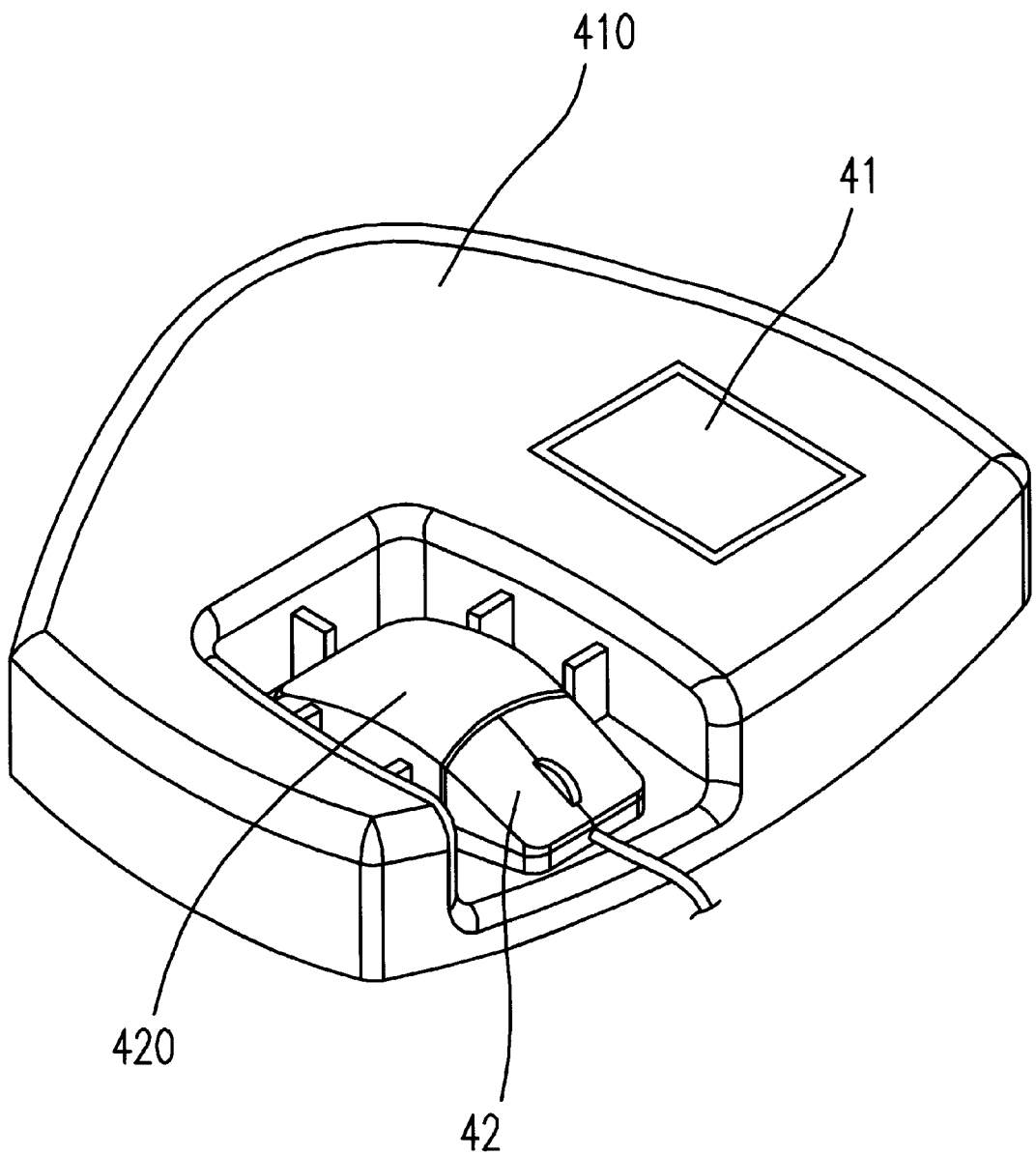
FIG. 5 is a schematic diagram showing an exemplified structure of the double-mode input control device of FIG. 4.

Please refer to FIG. 4 which is a schematic circuit block diagram showing another embodiment of a double-mode input control device according to the present invention. The input control device consists of a touch pad device 41 and a mouse device 42 having respective housings 410 and 420. The mouse device 42 includes a mouse sensor 422, a switching device 423, a control unit 425 and an interface circuit 426 accommodated in the housing 420, and a second signal connector 421 and a key switch 424 mounted on and exposed from the housing 420. The mouse device 42 also includes a signal channel 43 such as a signal cable, an infrared-ray (IR) signal transmission module or a radio-frequency (RF) signal transmission module for communicating with a computer 44. The operational principle of this input control device is similar to that of the embodiment with reference to FIG. 2 except the manipulation of the touch pad device 41 which can be made in a conventional manner. An exemplified structure of the double-mode input control device of FIG. 4 is schematically shown in FIG. 5 wherein the touch pad mode is to be performed.

According to the present invention, the user does not have to purchase two separate input control devices. The two input control devices may share the same key switch, control unit, interface circuit, and signal channel. In addition, one of the ports of the computer can be saved for another peripheral equipment. Moreover, the desk space is made flexible. When the desk space is enough, the mouse device can be detached from the trackball or touch pad device to move freely. When the desk space is not enough, the mouse device can be attached to the trackball or touch pad device, and the input control operation can be made by the trackball or touch pad device.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multi-mode input control device for use with a computer via a graphic user interface, comprising:
   a trackball for performing a rotating motion in response to a first external force;
   a trackball sensor for generating a first cursor movement control signal according to said rotating motion;
   a first signal connector electrically connected to said trackball sensor for transmitting said first cursor movement control signal;
   a base housing accommodated therein said trackball sensor and mounted thereon said trackball and said first signal connector; and
   a mouse device connected to said computer via a signal channel, performing a shift motion in response to a second external force, and including:
      a mouse sensor for generating said second cursor movement control signal according to said shift motion;
      a switching device electrically connected to said mouse sensor and said second signal connector for allowing either of said first and second cursor movement control signals to pass through said signal channel;
      a key switch for entering a command to said computer by exerting thereon a third external force so as to generate an input signal;
      a control unit electrically connected to said switching device and said key switch for processing said first and second cursor movement control signals and said input signal;
      an interface circuit electrically connected to said control unit and said signal channel for transforming said first and second cursor movement control signals and said input signal into a designated format suitable for transmission to said computer;
      a mouse housing accommodated therein said mouse sensor, said switching device, said control unit and said interface circuit, and mounted thereon said second signal connector and said key switch; and
   a second signal connector to be coupled to said first signal connector;
   wherein in a first mode that input control is performed by said mouse device, said first and second signal connectors are disconnected, and said second cursor movement control device is transmitted to said computer via said signal channel, and in a second mode that input control is performed by said trackball, said first and second signal connectors are connected, and said first cursor movement control signal is transmitted to said computer via said signal channel.

2. The multi-mode input control device according to claim 1 wherein said first signal connector is directly mounted on said base housing, and said second signal connector is directly mounted on said mouse housing so that said mouse housing is attached to said base housing when said first and second signal connectors are connected.

3. The multi-mode input control device according to claim 2 wherein said base housing includes a recess on a surface thereof for receiving said mouse housing.

4. The multi-mode input control device according to claim 1 wherein said base housing includes a recess on a surface thereof for receiving said mouse device, said first signal connector is arranged in said recess, and electric connection between said first and second signal connectors are achieved once said mouse device is placed into said recess.

5. A multi-mode input control device for use with a computer via a graphic user interface, comprising:
   a touch pad for generating a first cursor movement control signal according to a user's touch motion thereon;
   a first signal connector electrically connected to said touch pad for transmitting said first cursor movement control signal;
   a base housing mounted thereon said touch pad and said first signal connector; and
   a mouse device connected to said computer via a signal channel, performing a shift motion in response to a second external force, and including:
      a mouse sensor for generating said second cursor movement control signal according to said shift motion;
      a switching device electrically connected to said mouse sensor and said second signal connector for allowing either of said first and second cursor movement control signals to pass through said signal channel;
      a key switch for entering a command to said computer by exerting thereon a third external force so as to generate an input signal;
      a control unit electrically connected to said switching device and said key switch for processing said first and second cursor movement control signals and said input signal;
      an interface circuit electrically connected to said control unit and said signal channel for transforming said first and second cursor movement control signals and said input signal into a designated format suitable for transmission to said computer; a mouse housing accommodated therein said mouse sensor, said switching device, said control unit and said interface circuit, and mounted thereon said second signal connector and said key switch; and
   a second signal connector to be coupled to said first signal connector;
   wherein in a first mode that input control is performed by said mouse device, said first and second signal connectors are disconnected, and said second cursor movement control device is transmitted to said computer via said signal channel, and in a second mode that input control is performed by said touch pad, said first and second signal connectors are connected, and said first cursor movement control signal is transmitted to said computer via said signal channel.

6. The multi-mode input control device according to claim 5 wherein said first signal connector is directly mounted on said base housing, and said second signal connector is directly mounted on said mouse housing so that said mouse housing is attached to said base housing when said first and second signal connectors are connected.

7. The multi-mode input control device according to claim 6 wherein said base housing includes a recess on a surface thereof for receiving said mouse housing.

8. The multi-mode input control device according to claim 5 wherein said base housing includes a recess on a surface thereof for receiving said mouse device, said first signal connector is arranged in said recess, and electric connection between said first and second signal connectors are achieved once said mouse device is placed into said recess.

9. A multi-mode input control device for use with a computer via a graphic user interface by performing an input control operation, comprising:

a first housing having a recess on a surface thereof, and keeping unmoved during said input control operation;

a first input device accommodated in said first housing for generating a first cursor movement control signal in response to a first external force;

a first signal connector mounted on said first housing in said recess and electrically connected to said first input device for transmitting said first cursor movement control signal to said computer;

a second housing optionally received in said recess, and moved during said input control operation;

a second input device accommodated in said second housing for generating a second cursor movement control signal in response to a second external force;

a signal channel electrically connected to said second input device for communicating with said computer;

a second signal connector mounted on said second housing at a specific position corresponding to a position of said first signal connector when said second housing is received into said recess of said first housing, and electrically connected to said second input device for transmitting said second cursor movement control signal to said computer in a first mode that said input control operation is performed by said second input device, and transmitting said first cursor movement control signal to said computer in a second mode that said input control operation is performed by said first input device; and a switching device electrically connected to said first and second input devices for determining either of said first and second modes is performed;

wherein said second input device includes:
a sensor for generating said second cursor movement control signal according to the movement of said second housing;
a key switch for entering a command to said computer by exerting thereon a third external force so as to generate an input signal;
a control unit electrically connected to said switching device and said key switch for processing said first and second cursor movement control signals and said input signal; and
an interface circuit electrically connected to said control unit and said signal channel for transforming said first and second cursor movement control signals and said input signal into a designated format suitable for transmission to said computer.

10. The multi-mode input control device according to claim 9 wherein said second device is a mouse device.

11. The multi-mode input control device according to claim 10 wherein said first device is a trackball device.

12. The multi-mode input control device according to claim 10 wherein said first device is a touch pad device.

13. The multi-mode input control device according to claim 9 wherein in said first mode, said first and second connectors are disconnected so that said second input device is individually moved to generate said second cursor movement control signal, and said second cursor movement control signal is transmitted to said computer via said signal channel.

14. The multi-mode input control device according to claim 9 wherein in said second mode, said first and second connectors are electrically connected so that said first input device is manipulated to generate said first cursor movement control signal, and said first cursor movement control signal is transmitted to said computer via said first and second signal connectors and said signal channel.

15. The multi-mode input control device according to claim 9 wherein said signal channel includes a signal cable.

16. The multi-mode input control device according to claim 9 wherein said signal channel includes an infrared-ray (IR) signal transmission module.

17. The multi-mode input control device according to claim 9 wherein said signal channel includes a radio-frequency (RF) signal transmission module.

18. The multi-mode input control device according to claim 9 wherein said switching device is electrically connected to said sensor and said second signal connector for allowing either of said first and second cursor movement control signals to pass through said signal channel.

19. A multi-mode input control device for use with a computer via a graphic user interface by performing an input control operation, comprising:

a first housing keeping unmoved during an input control operation;

a first input device accommodated in said first housing for generating a first cursor movement control signal in response to a first external force;

a first signal connector mounted on said first housing and electrically connected to said first input device for transmitting said first cursor movement control signal to said computer;

a second housing optionally attached to said first housing, and moved during said input control operation;

a second input device accommodated in said second housing for generating a second cursor movement control signal in response to a second external force;

a signal channel electrically connected to said second input device for communicating with said computer; and a second signal connector mounted on said second housing at a specific position corresponding to a position of said first signal connector when said second housing is attached to said first housing, and electrically connected to said second input device for transmitting said second cursor movement control signal to said computer via said signal channel in a first mode that said input control operation is performed by said second input device, and transmitting said first cursor movement control signal to said computer via said signal channel in a second mode that said input control operation is performed by said first input device;

wherein said second input device includes:
- a sensor for generating said second cursor movement control signal according to the movement of said second housing;
- a switching device is electrically connected to said sensor and said second signal connector for allowing either of said first and second cursor movement control signals to pass through said signal channel;
- a key switch for entering a command to said computer by exerting thereon a third external force so as to generate an input signal;
- a control unit electrically connected to said switching device and said key switch for processing said first and second cursor movement control signals and said input signal; and
- an interface circuit electrically connected to said control unit and said signal channel for transforming said first and second cursor movement control signals and said input signal into a designated format suitable for transmission to said computer.

20. The multi-mode input control device according to claim 19 wherein said second device is a mouse device.

21. The multi-mode input control device according to claim 20 wherein said first device is an input device selected from a group consisting of a trackball device and a touch pad device.

22. The multi-mode input control device according to claim 19 wherein in said first mode, said first and second connectors are disconnected so that said second input device is individually moved to generate said second cursor movement control signal, and said second cursor movement control signal is transmitted to said computer via said signal channel.

23. The multi-mode input control device according to claim 19 wherein in said second mode, said first and second connectors are electrically connected so that said first input device is manipulated to generate said first cursor movement control signal, and said first cursor movement control signal is transmitted to said computer via said first and second signal connectors and said signal channel.

24. The multi-mode input control device according to claim 19 wherein said signal channel is selected from a group consisting of a signal cable, an infrared-ray (IR) signal transmission module, and a radio-frequency (RF) signal transmission module.

* * * * *